(12) United States Patent
Hira

(10) Patent No.: US 6,639,705 B2
(45) Date of Patent: Oct. 28, 2003

(54) OPTICAL FILM

(75) Inventor: Yasuo Hira, Yokohama (JP)

(73) Assignees: Hitachi, Ltd., Tokyo (JP); Nitto Denko Corporation, Ibaraki (JP)

(*) Notice: Subject to any disclaimer, the term of this patent is extended or adjusted under 35 U.S.C. 154(b) by 0 days.

(21) Appl. No.: 10/234,099

(22) Filed: Sep. 5, 2002

(65) Prior Publication Data

US 2003/0002162 A1 Jan. 2, 2003

Related U.S. Application Data

(63) Continuation of application No. 09/688,876, filed on Oct. 17, 2000.

(30) Foreign Application Priority Data

Oct. 18, 1999 (JP) .............................. 11-294876

(51) Int. Cl.[7] .............................. G02F 1/00; G02F 1/03; G02F 27/10
(52) U.S. Cl. .................... 359/237; 359/242; 359/619
(58) Field of Search .............................. 359/237, 619, 359/242, 618, 620

(56) References Cited

U.S. PATENT DOCUMENTS 5,256,337 A * 10/1993 Reid et al. ............... 252/584

FOREIGN PATENT DOCUMENTS

| JP | 5-224243 | 9/1993 |
|---|---|---|
| JP | 6-027454 | 2/1994 |
| JP | 6-095099 | 4/1994 |
| JP | 10-039769 | 2/1998 |
| JP | 10-039770 | 2/1998 |
| JP | A-10-301208 | 11/1998 |
| JP | A-10-339874 | 2/2000 |
| KR | 9405965 | 6/1994 |

* cited by examiner

Primary Examiner—Jordan M. Schwartz
Assistant Examiner—Timothy J Thompson
(74) Attorney, Agent, or Firm—Antonelli, Terry, Stout & Kraus, LLP

(57) ABSTRACT

An optical film comprising an optical element capable of forming a spatial distribution of light transmittance, and a light shield layer positioned on an opposite side of the optical element. The light shield layer is composed of a compound which changes light transmittance permanently depending on irradiation of an energy beam, and has light transmitting regions near a position corresponding to the optical element and light shielding regions at positions other than the light transmitting regions. The light shielding regions have a smaller light transmittance than the light transmittance of the light transmitting regions.

10 Claims, 8 Drawing Sheets

(SELF ALIGNMENT EXPOSURE BY LENS)

OPTICAL FILM

CROSS REFERENCE TO RELATED APPLICATION

This is a continuation of U.S. application Ser. No. 09/688,876, filed Oct. 17, 2000, the subject matter of which is incorporated by reference herein.

BACKGROUND OF THE INVENTION

This invention relates to an optical film which is an image quality improved film and a liquid crystal display apparatus using the same.

Recently, image display apparatuses typified by a liquid crystal display panel are widely used as a display means in personal computers, work stations, etc. As to the quality of images displayed by using these apparatuses, high display contrast, wide angle of field properties, and the like are required.

In order to realize such image quality, JP-A 6-27454 discloses a liquid crystal display installing a micro lens array wherein a light shield film is formed at corresponding positions for each lens. JP-A 6-95099 discloses the use of a rear light source having high directivity as a light source for a liquid crystal display panel, and installation of a light diffusion plate between the liquid crystal display panel and the rear light source. Further, JP-A 10-39769 discloses as a screen in a rear projection type projection apparatus, a screen wherein alignment pattern of microlens of the screen and that of a light shield film are coincided.

As a process for producing a light shield layer used for improving the image quality mentioned above, that is a black matrix, there are generally known a process for forming a thin metal film, a process comprising coating a photosensitive resin dispersing a pigment such as carbon black, etc. or a photosensitive resin dissolving a dye such as a black dye, etc. on a substrate and exposing the coated film to light using photolithography, and the like.

But the prior art is insufficient for providing optical films having desired properties.

BRIEF SUMMARY OF THE INVENTION

It is an object of the present invention to provide an optical film wherein a light shield layer excellent in light shielding properties is accurately placed in a desired position, and said optical film having wide angle of field properties, and an image display apparatus such as a liquid crystal display device installing such an optical film therein.

The present invention provides an optical film comprising an optical element capable of forming spatial distribution of light transmittance, and a light shield layer positioned on an opposite side of the optical element, said light shield layer being composed of a compound which changes light transmittance depending on irradiation of an energy beam, wherein the light transmittance passing the light shield layer is modulated spatially depending on a dose of energy beam.

The light shield layer can be modified variously for improving light shield properties and angle of field properties.

The present invention further provides an image display apparatus such as a liquid crystal display installing such an optical film.

DETAILED DESCRIPTION OF THE INVENTION

Figure 1:
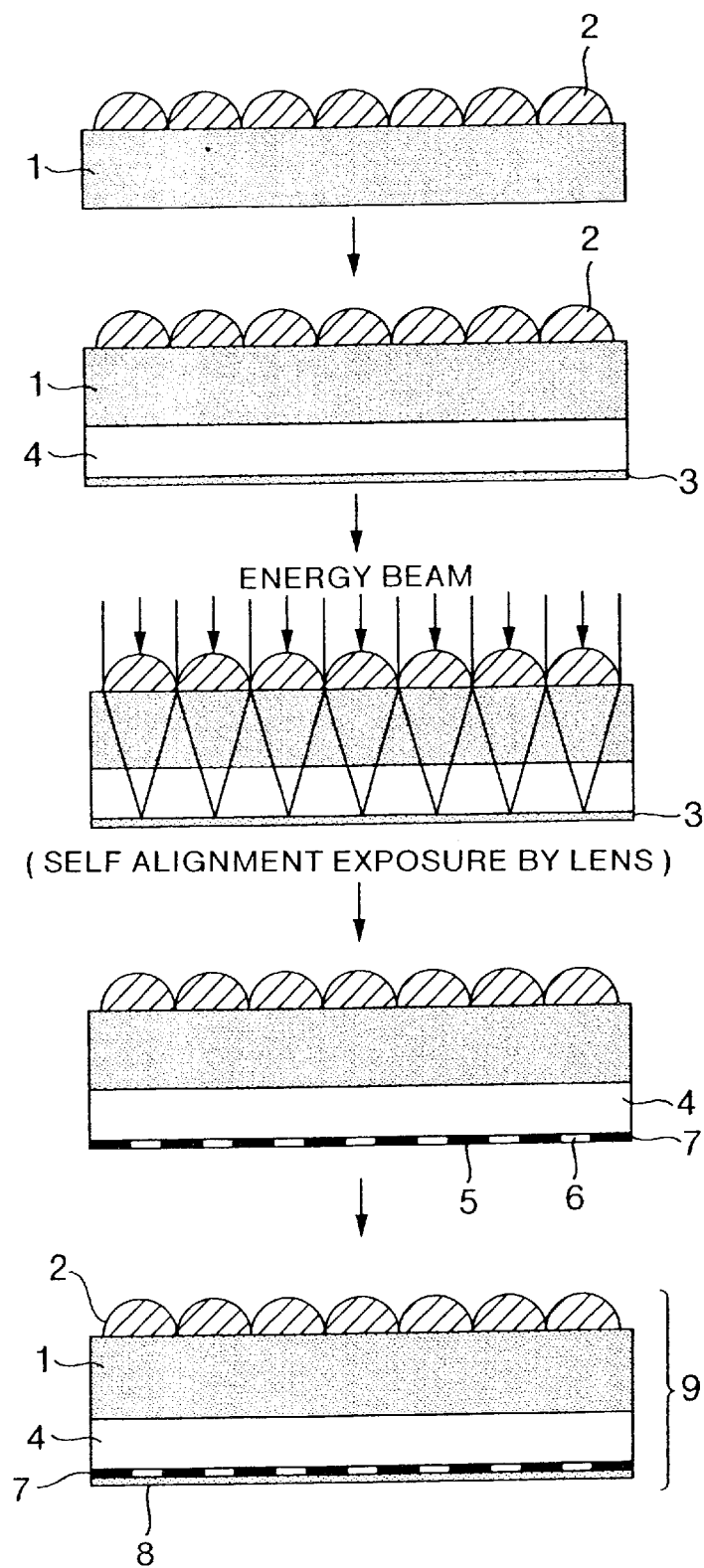
FIG. 1 is a series of cross-sectional views for explaining a process for producing the optical film in Example 1.

When a combination of microlenses for enlarging an angle of field of the liquid crystal panel, and a light shield layer (black matrix) for suppressing retroreflection of outer light reflected from the surface of the microlenses is applied to an image display apparatus having wide angle of field properties, for example a liquid crystal display panel, precise positional relation between the microlenses and the positional pattern of light shield layer can exhibit its function for the first time.

But the microlenses for realizing wide angle of field and the light shield film for realizing high contrast are produced independently, followed by combination of them in a later step. Therefore, it is very difficult to align both precisely within several microns.

That is, in order to obtain sufficiently wide angle of field, it is neccesary to use microlenses having a short focal length. For such a purpose, the curvature radius of microlens is made small, and the height of the microlens per se is made large. These requirements not only make the production of molds and stampers for producing lenses difficult but also cause new problems of failing to obtain desired lens shape due to insufficient fluidity of materials, difficulty of mold release of lenses (films) from molds or stampers, and delamination of the produced lenses.

Further, when the lenses are produced by using materials having a high refractive index, usable materials are limited undesirably. For example, the materials are generally limited to acrylic resins, polyesters, polystyrenes, polyolefins, polycarbonates, polyethers, polyether-imides, triacetylcellulose resins, etc., resulting in providing a large obstacle for production of microlenses.

On the other hand, in order to produce the light shield films having high precision, a photolithography method is generally used. That is, after forming a photosensitive layer on a transparent substrate, patterning is conducted by irradiating an energy beam such as ultraviolet light from the photosensitive layer side to produce a light shield layer.

At this time, in order to improve the precision more and more, it is necessary to stick the photosensitive layer to a photo mask at the time of exposure to light. But since the photosensitive layer is black, there arise problems from the viewpoint of production such as sticking of the surface due to stored heat at the time of exposure, insufficient transmission of the energy beam, etc.

When a screen including a lens array sheet aligning microlenses having a relatively large size of several hundred microns or more used in a conventional rear projection type image display apparatus is produced by using the above-mentioned producing methods, there is no problem whether a conventional extrusion molding or injection molding is used.

But it is difficult to apply these techniques to a recent technology requiring higher precision or usage for liquid crystal display apparatuses having microlenses with several ten micron sizes.

In order to solve such a problem, JP-A 10-39770 discloses a process for producing a microlens sheet which has a lens layer on one side functioning as a fine unit lens aligned body and a pattern on another side correspoding to the fine unit lens aligned body, whereby the microlens array sheet has an optical function layer with a complementary function for individual fine unit lenses.

Such a microlens array sheet can be produced by filling a ultraviolet-curing resin in a mold stamped with a large number of curved surface grooves in parallel, piling a flat plate-like transparent substrate thereon, curing the resin by irradiating ultraviolet light to form a microlens sheet. Then, the side of the flat plate-like transparent substrate having no microlens, a black coating agent is applied, followed by lamination of a transparent positive-working resist thereon by coating. The positive-working resist is exposed to ultraviolet light from the microlens array side, followed by removing of photosensitized portion of the resist and the black coating agent exposed through openings of the resist by dissolution to complete the microlens array sheet having an optical function layer which has an open belt-like shield in stripe shape at the top portions of convexes of the microlens array.

According to the above-mentioned technique, since the ultraviolet light is irradiated from the transparent substrate side and the light shield layer is formed by self alignment using the microlenses as a mask, it is easy to precisely correspond the light shield layer to individual pattern positions of microlens array.

On the other hand, since a part of the black coating layer containing carbon black, black dyes, black pigments, or the like is made open and patterning of the positive-working resist is conducted via the black coating layer, the transmittance of ultraviolet light is poor, resulting in failing to obtain the pattern having desired precision.

Therefore, there remain various problems from the viewpoint of production in that irradiation time of ultra-violet light should be elongated due to poor transmittance of the black coating layer, a long time is necessary for the exposure step for patterning because the film thickness of the black coating layer is not allowed to be thin, or it is impossible to obtain a light shield film having excellent light shield properties.

In contrast, according to the present invention, the above-mentioned problems of the prior art are overcome.

According to the present invention, there is provided an optical film comprising an optical element capable of forming spatial distribution of light transmittance, and a light shield layer positioned on an opposite side of the optical element, said light shield layer being composed of a compound which changes light transmittance depending on irradiation of an energy beam, wherein the light transmittance passing the light shield layer is modulated spatially depending on a dose of energy beam.

Further, the light shield layer can be composed of a compound containing silver halide, more concretely, at least Ag (silver) or a compound containing Ag. The light transmittance passing the light shield layer is modulated spatially either by irradiating the compound with an energy beam, or depending on a concentration of silver contained in the light shield layer.

In addition, the light shield layer can be composed of a gelatin material dispersing therein at least silver or a compound containing silver, wherein by irradiating the light shield layer with an energy beam, a silver concentration in an irradiated region is made smaller than that in a non-irradiated region.

Still further, the light shield layer can be composed of a gelatin material dispersing therein at least silver or a compound containing silver, and a photosensitive material containing a silver halide which has a property of making a silver concentration in a region irradiated by an energy beam smaller than that in a non-irradiated region.

The present invention also provide an optical film comprising an optical element capable of forming spatial distribution of light transmittance, a light shield layer and a light diffusion layer, said light shield layer being positioned between the optical element and the light diffusion layer and composed of a compound which changes light transmittance depending on irradiation of an energy beam, wherein the light transmittance passing the light shield layer is modulated spatially depending on a dose of energy beam.

The present invention further provides an optical film comprising an optical element capable of forming spatial distribution of light transmittance, a light shield layer and a light diffusion layer, said light shield layer containing light transmitting regions and light shielding regions, and said light diffusion layer being positioned at least upper side or lower side of the light shield layer corresponding to the light transmitting regions.

The present invention still further provides an optical film comprising an optical element capable of forming spatial distribution of light transmittance, and a light shield layer positioned on an opposite side of the optical element, said light shield layer containing small balls having transmittivity.

In the above-mentioned optical films, the gap between the light shield layer and the light diffusion layer is preferably 400 $\mu$m or less, more preferably 150 $\mu$m or less, particularly preferably 50 $\mu$m or less or without the gap.

Further, in the above-mentioned optical film, the optical element is preferably a microlens array, and the optical film can take a shape of a film or a substrate.

The present invention also provides a liquid crystal display comprising a liquid crystal cell, a rear illumination means for emitting collimate rays, and an optical film of the present invention mentioned above, wherein the liquid crystal cell is sandwiched between the rear illumination means and the optical film.

The present invention still further provides a rear projection apparatus comprising a projector containing a light source and a liquid crystal cell, a mirror for reflecting a light from the projector, and a screen for projecting the light reflected by the mirror, said screen being composed of an optical film of the present invention mentioned above.

Considering importance of the light shield layer in the present invention, materials for forming the light shield layer are explained in more detail.

The materials for forming the light shield layer has a feature in that the light shield layer per se changes to a layer wherein light transmittance is modulated spatially by irradiating an energy beam.

Concretely, the materials are silver or a compound containing silver, for example, silver bromide which is high in light transmittance before irradiation with an energy beam, while after irradiation with the energy beam, it changes to a layer wherein the light transmittance is modulated spatially by chemical treatment or physical treatment.

One example of such effective materials is gelatin dispersing therein silver or a compound containing silver atoms, wherein the light transmittance changes by the change of silver concentration. More concretely, a photosensitive material containing a silver halide salt is suitable.

But a photosensitive material containing a silver halide salt conventionally used cannot be used in the present invention, since the silver contained in the photosensitive material is freed and blacked in that portion.

In the present invention, the photosensitive material containing a silver halide salt should improve light transmittance by irradiation with an energy beam.

The photosensitive layer before forming the light shield layer has a feature in that the light transmittance at the time of exposure to light for patterning is predominantly high compared with a conventional material used for a light shield layer (e.g. carbon black resins, etc.) due to the use of a silver halide salt dispersed in gelatin.

Therefore, in order to form a pattern of black matrix precisely corresponding to the optical element (e.g. microlenses), it is possible to sufficiently sensitize a photosensitive layer having a large film thickness, even in the case of conducting so-called self alignment exposure wherein the energy beam is irradiated through an optical element. By subjecting the silver halide salt photosensitive layer to development and fixation, the black matrix having a sufficiently high optical density, i.e., a region having high light transmittance and a light shield region can be formed efficiently.

Further, the light shield layer obtained by using the above-mentioned silver halide salt photosensitive agent has a feature in that a light transmittance ratio of the high light transmittance region to the light shield region is remarkably high and a geometrical level difference between the light shield region and the high light transmittance region is hardly produced. Thus, it is possible to suppress generation of light scattering harmful for image quality and to form a voidless light diffusion layer for enlarging the angle of field. Further, in the high light transmittance region (the region irradiated with energy beam) formed by a series of steps of exposure, development and fixation, non-uniform components are present and act for scattering the incident light, so that the angle of field is enlarged thereby comparing with a conventional transparent film.

Reasons for using the silver halide salt photosensitive materials for producing the optical films of the present invention mentioned above can be summarized as follows.

(1) Since the photosensitive materials have high light transmittance and high sensitivity, the film thickness of the photosensitive materials can be made thick, resulting in forming a light shield layer having a high photographic density (optical density). Concretely, there can be obtained an optical film having a photosensitive layer with a thickness of about 5 $\mu m$ wherein the optical density is 3 or more in the light shield layer region and the transmittance is 90% or more in the high light transmittance region.

(2) Since sensitive wavelengths can be changed optionally by changing the kinds, mixing ratios, etc. of the photosensitive materials, workability can be improved.

(3) There is almost no boundary level difference between the region wherein the light passes and the region wherein the light should be shielded. The change of light transmittance obtained by a series of steps of exposure, development and fixation is caused by the change of silver atom concentration dispersed in the gelatin, and the film thickness of gelatin per se is almost not changed. Therefore, the level difference between the high light transmittance region and the light shield region is as small as about 0.5 $\mu m$ at most, and generally about 0.2 $\mu m$ even when the photosensitive layer has a film thickness of 5 to 20 $\mu m$ (generally speaking, when the region has a larger silver concentration, the film thickness becomes larger).

In contrast, when a well known photoresist conventionally used is used, the level difference of 5 $\mu m$ or more is produced in order to obtain the same optical density as mentioned above, resulting in causing blurred image, lowering of contrast and lowering of brightness due to scattering of the light for forming image at the boundary.

In such a case, when the silver halide photosensitive agent usable in the present invention is used, the level difference can be made small, resulting in suppressing deterioration of the image to a minimum.

(4) In the high light transmittance region, a residue of the silver halide salt or a component presumably the gelatin layer is present. Since such a component has a function of scattering the light without lowering the light transmittance, it exhibits a function of enhancing the effect for enlarging the angle of field of microlenses.

Generally speaking, the light shield layer is formed in the silver salt photography as follows. When silver halide in gelatin is exposed to light, photoelectrons are produced, whereby silver ions between lattices form silver atoms. By accumulating this step, there is produced a latent image which is developable. When silver halide particles having the latent image is reacted with a reducing agent such as hydroquinone, the whole particles are reduced to silver atoms to form a black image composed of metallic silver, corresponding to the light shield layer of the present invention (black matrix).

But, in the present invention, it is impossible to use the conventional materials for silver salt photography with blacking mechanism mentioned above. This is because these materials are changed to the black layer, that is, the light shield layer in the region exposed to light, so that it is impossible to form a high light transmittance region in the region where the light is collected using the self alignment exposure technique applying microlens effect.

In order to simplify the production process of the optical films of the present invention and to form the light shield layer (black matrix) with good precision, it is necessary to improve transmittivity in the region wherein the energy beam is irradiated and to make the non-irradiated region black.

In order to meet the above requirement, the following materials, processes and steps can be used in the present invention to form the light shield region and the high light transmittance region simultaneously using silver halide salts.

(1) After exposing the whole surface of a silver halide sensitizing agent using visible light or ultraviolet light, only the predetermined portions are exposed to red light or infrared light, followed by development and fixation. In this step, there is applied a phenomenon wherein the silver salt latent image formed by previous whole surface exposure to the visible light or ultraviolet light disappears by exposure to red light or infrared light. In order to enhance the effect, it is preferable to add a sensitivity reducing dye such as a triphenylmethane series dye previously to the silver halide sensitizing agent.

(2) The silver halide sensitizing agent preferably contains a special compound so as to make only the exposed portions soluble in an aqueous solution of sodium thiosulfate. Such a special compound includes p-phenylenediamine, ammonia, potassium thiocyanate, thisulfate salts, or the like.

(3) After exposure to light, the silver halide latent image produced in the exposed portion is bleached (removed by dissolution), and silver halide in the non-exposed portion is exposed to light again to produce a latent image, followed by development and fixation to give a light shield layer. As the bleaching agent, there can be used an aqueous solution of cerium sulfate, potassium dichromate, potassium permanganate, etc., these compounds being able to dissolve silver.

(4) There can be employed a process for lowering an optical density (photographic density) by excess exposure to light. According to this process, the halogen produced in silver halide crystals by absorption of light binds to the latent image silver again to consume the latent image silver to reduce the photographic density after development. In this process, in order to exhibit the above-mentioned effect remarkably, there can be used a silver halide photosensitive material matured in the presence of ammonia during the production of the material.

Further, there can be applied to the present invention any photosensitizing technique using silver halide to produce the same phenomena as mentioned above, e.g. modification of sensitizing agents, developing agents, fixers, auxiliary materials, steps such as exposure to light, etc.

As a technique for obtaining a wide angle of field image which is another indispensable subject of the present invention, a light diffusion layer is formed on upper surface or lower surface of the light shield layer. By forming the light diffusion layer near the light shield layer (black matrix), it becomes possible to make deterioration of image low and to obtain an image having a wide angle of field. By this, there can be obtained the same effect (wide angle of field) without shortening the focal length of microlenses.

The present invention is illustrated in more detail with reference to the following Examples using drawings, which are illustrative, and do not limit the scope of the present invention.

EXAMPLE 1

FIG. 1 is a series of cross-sectional views for explaining a process for producing an optical film of the present invention in the shape of a film. An optical film in the form of a solid substrate (e.g. 5–6 mm thick), not in the form of a flexible film (e.g. about 500 $\mu$m in a total thickness), can also be produced in the same manner.

After filling an ultraviolet-curing resin between lens grooves in a Ni stamper (not shown in the drawing) having a shpe of microlenses and a film for microlenses 1 (100 $\mu$m thick) made from a polycarbonate film, the ultraviolet-curing resin was cured by exposing to ultraviolet light to form microlenses 2 (focal length about 120 $\mu$m).

Then, on a black matrix forming film 4 made from a polyester film, a light shield layer forming film 3 obtained by coating gelatin dispersing silver bromide sensitizing agent was laminate bonded. The whole surface of light shield layer forming film 3 was exposed to ultraviolet light from the silver bromide sensitizing agent formed side. Then, self alignment exposure was conducted using parallel infrared light from the microlens array 2 side.

The light shield layer forming film 3 was subjected to conventional development and fixation to form a light shield layer 7 comprising a high light transmittance region 6 which was obtained by collecting the infrared light by the microlenses 2 and a light shield region 5 which was obtained in the region not exposed to the infrared light or exposed to a little dose of the infrared light. Then, a light diffusion layer 8 was formed on the light shield layer 7 using a conventional laminate method. The light diffusion layer 8 was made from a thin film of blend of TAC (triacetylcellulose) and polystyrene beads. The optical film 9 of the present invention was completed by the above-mentioned steps.

As the film or substrate for forming the microlenses 2 or the light shield layer 7, it is preferable to use a material which is transparent to at least visible light. Examples of such a material are glass, various kinds of plastic substrates, sheets and films.

As the transparent films, plastic sheets or plastic films are preferably used from the viewpoint of easiness of handling. Typical examples of such plastics are acrylic resins, methacrylic resins, polystyrenes, polyesters, polyolefins, polyamides, polycarbonates, polyethers, polyimides, polyether-imides, polyamide-imides, polyether sulfones, maleimide resins, polyvinyl chlorides, poly(meth)acrylic esters, melamine resins, triacetylcellulose resins, norbornene resins, etc.

Further, it is possible to use copolymers of these resins mentioned above, blended materials of these resins, and cross-linked products obtained from these resins. Among these materials, triacetylcellulose film, polyester film, polyethylene terephthalate film and polycarbonate film are particularly preferable from the viewpoint of a balance of optical properties such as transparency, etc. and mechanical strength.

The process for forming the light shield layer 7 mentioned above is called as an autopositive method, which comprises exposing the whole surface of a silver halide sensitizing agent to visible light or infrared light, irradiating predetermined portions with visible light or infrared light again, followed by development and fixation. The silver salt latent image formed by exposure is subjected to the application of a phenomenon wherein the silver salt latent image disappears by later irradiation with visible light or infrared light.

The wavelength of light used for exposure or development and fixation is preferably, for example, 550 to 750 nm when the silver halide sensitizing agent is silver chloride, 650 to 1100 nm when silver bromide is used. If necessary, a sensitivity reducing dye can be added to the silver halide sensitizing agent to shift the above-mentioned photosensitive wavelengths. As the sensitivity reducing agent, there can be used Phenosafranin, Pinakryptol Green, etc.

In this Example, the light shield layer forming film 3 obtained by coating the silver halide sensitizing agent dispersed in gelatin was used for forming the light shield layer 7 based on the following reasons:

The silver halide sensitizing agent is a photosensitive material obtained by dispersing silver or a compound containing silver atoms in gelatin and is capable of modulating the light transmittance with the change of concentration of the compound. The larger the Ag concentration becomes, the lower the light transmittance becomes, and the smaller the Ag concentration becomes, the light transmittance is improved.

This mechanism can be explained as follows. When the silver halide in the gelatin is exposed to light, photoelectrons are produced to form silver atoms from the silver ions in the lattices. By accumulating such a step, the silver halide sensitizing agent becomes a latent image which is developable. When the silver halide particles having the latent image is reacted with a reducing agent such as hydroquinone, the whole silver halide particles are reduced to silver atoms to show a black color due to metallic silver.

As the silver halide salt sensitizing agent, there can be used not only commercially available photographic materials such as silver chloride, silver bromide, silver iodide, etc., but also techniques disclosed in the following references as to compositions and concentrations of the sensitizing agents, dispersing amounts in gelatin, auxiliary materials for photosensitive materials, exposure, development, fixation, etc.
(1) C. E. K. Mees, T. H. James: The Theory of the Photographic Process, 3rd. ed., Macmillan New York (1966)
(2) D. A. Spencer: The Focal Dictionary of Photographic Technology, (1973)
(3) James, T. H.: The Theory of Photographic Process, 4th ed., John Wily & Sons, New York (1977)
(4) J. M. Sturge: Neblette's Handbook of Photogray and Reprography, Van Nostrand Reinhold (1977)
(5) Shinichi Kikuchi, et al: Kagaku Shashin Binran, Vol. I to III, Maruzen (1964)
(6) The Japan Society of Applied Physics, Kagaku Konwakai: Properties of Colors and Technology, Asakura Shoten (1988)
(7) Shinichi Kikuchi: Shashin Kagaku 4th ed. Kyoritsu Shuppan (1993)
(8) Shinichi Kikuchi, et al: Progress of Image Engineering, Kagaku Kogyo Sha (1986)
(9) Eiichi Inoue, et al: Insha Kogaku 3 (Theory on Image Formatin), Kyoritsu Shuppan (1969)
These references are incorporated herein by reference.

As to the light diffusion layer 8, there can be used various materials and techniques for forming films and sheets using these materials, for example, a layer having fine unevenness, e.g. a finely granulated film obtained by using a Ni and the like metal stamper applying optical disk forming technique or a mold subjected to sand blast treatment, or tranfer film obtained therefrom, a film containing plastic beads using divinylbenzene, etc., or a film obtained by applying a surface treating technique for antiglare, a diffusion sheet used in liquid crystal back light, etc.

The positional relation and gap between the light shield layer 7 and the light diffusion layer 8 are explained below.

In this Example, the light diffusion layer 8 was formed after formation of the light shield layer 7 as shown in FIG. 1, but the light shield layer 7 can be formed after formatin of the light diffusion layer 8 to obtain the wide angle of field and high contrast.

Figure 2:
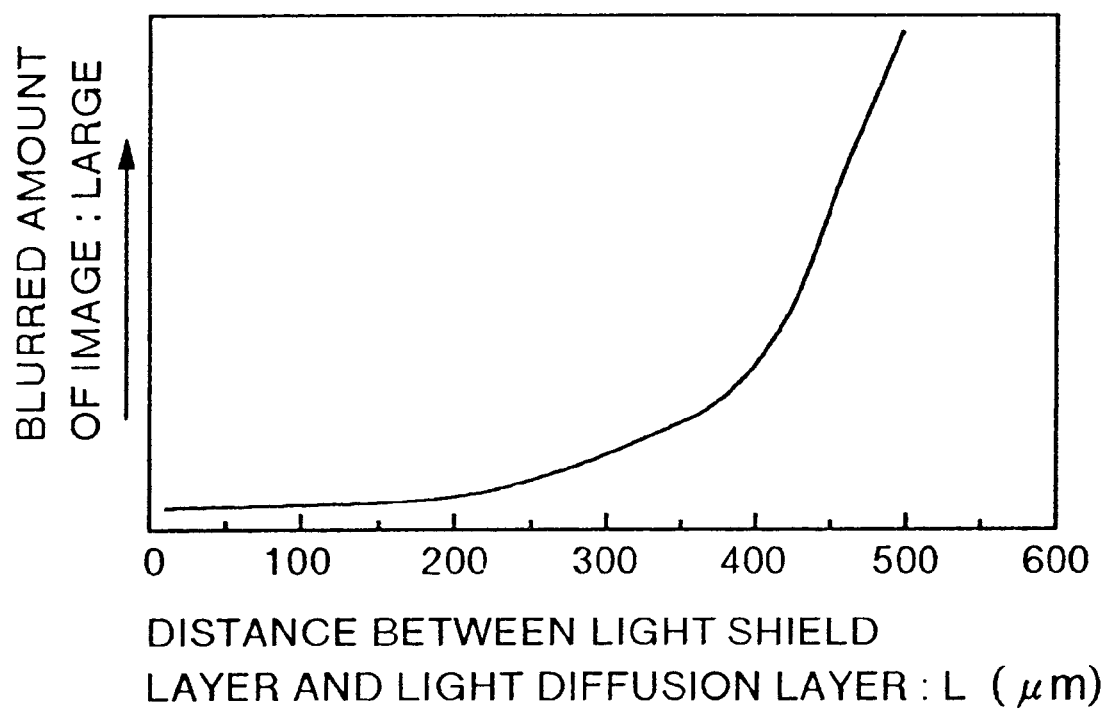
FIG. 2 is a graph showing a relationship between the distance from a light shield layer to a light diffusion layer and the blurred amount of image.

As to the gap between the two, FIG. 2 shows the relation between the blurred amount of image and the distance (L) between the light shield layer 7 and the light diffusion layer 8 when the optical film 9 of the present invention is installed in a commercially available TFT liquid crystal display panel.

The term "blurred amount of image" means an index showing "distinction" or "discrimination by naked eye" of displayed images or characters, and is expressed by the results obtained by naked eye observation. The smaller the value of blurred amount becomes, the clearer the image or characters becomes.

In this Example, the gap between the light shield layer 7 and the light diffusion layer 8 was made 400 $\mu$m or less. When the gap is within this range, no problem arises in usual display. Preferable gap is 150 $\mu$m or less, and more preferable gap is 50 $\mu$m or less and zero (a state of close contact of both layers).

The optical film shown in FIG. 1 shows 90% or more of light transmittance in the region 6 passing the light and the optical density of 3.5 in the light shield region 5, when the film thickness of the light shield layer 7 is about 5 $\mu$m.

Further, since the change of light transmittance in the light shield region 5 and the light passing region 6 formed by the steps of exposure to light, development and fixation depends on the change of concentration of silver atoms dispersed in gelatin, the film thickness of the light shield layer per se is hardly changed during the production process. For example, even if the film thickness of the light shield layer 7 is about 5 to 20 $\mu$m, the level difference between the light shield region 5 and the light passing region 6 is about 0.5 $\mu$m at most, and generally about 0.2 $\mu$m.

Comparing with the level difference of 5 $\mu$m or more according to a conventional method for forming the light shield layer using photolithography and making the optical density of 3.5 or more in the light shield region, the level difference in this Example is remarkably small, resulting in preventing blurred image and lowering in contrast and brightness.

EXAMPLE 2

The microlenses 2 shown in FIG. 3 were formed in the same manner as described in FIG. 1. On a rear side of the film 1 for microlenses, that is, the side opposite to the microlenses formed side, a light shield layer 7 was formed via a light diffusion layer 8 using the so-called photo solubilization method.

This method uses a sensitizing agent containing a mixture of p-phenylenediamine, ammonia, potassium thio-cyanate, thiosulfate salts, etc. as the silver halide salt sensitizing agent, and only the exposed region is made to be dissolved in an aqueous solution of sodium thiosulfate.

Figure 3A:
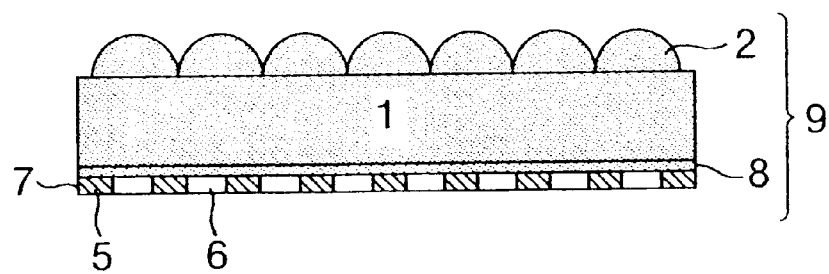
FIGS. 3A to 3D are cross-sectional views for explaining the optical film obtained in Example 2.

After the step of exposing to light from the microlenses 2 side, the same steps as disclosed in FIG. 1 were carried out to produce the optical film 9 shown in FIG. 3A.

As shown in FIG. 3A, it is effective to form the light diffusion layer 8 between the microlenses 2 and the light shield layer 7 for improving the contrast.

Figure 3B:
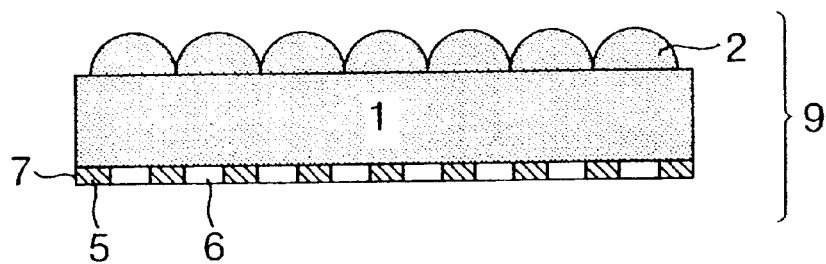

In the embodiment shown in FIG. 3B, the light diffusion layer 8 is not formed, but when the light diffusion layer 8 is formed, there can be obtained an optical film 9 having the same structure as shown in FIG. 1.

Further, as illustrated in FIG. 3B, even if the lamination is conducted in the order of the film 1 including micrlenses 2, the light shield layer 7, and the light diffusion layer 8, the object of the present invention, that is, the wide angle of field properties and high contrast properties are not damaged.

Figure 3C:
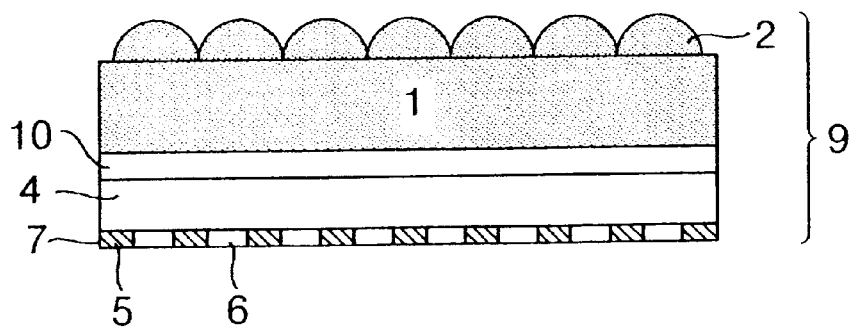

FIG. 3C shows an optical film 9 wherein a microlens film 1 having microlenses 2 and a light shield film forming film 4 coating a silver halide sensitizing agent thereon are bonded using an adhesive material 10, and a light shield layer 7 is formed by a photo solubilization method.

Figure 3D:
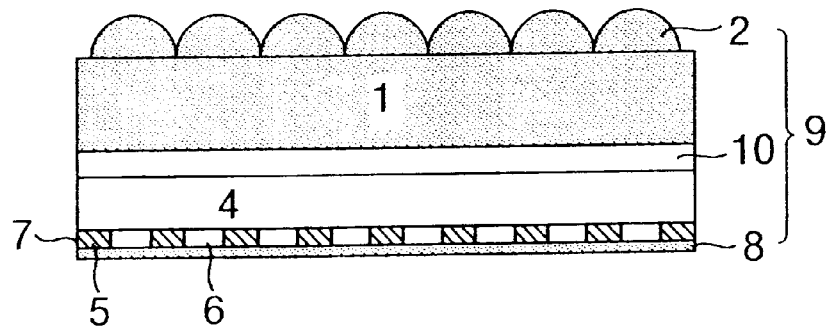

FIG. 3D shows an optical film 9 obtained by bonding a microlens film 1 having microlenses 2 with a light shield film forming film 4 coating a silver halide sensitizing agent thereon using an adhesive material 10, forming a light shield layer 7 by a photo solubilization method, and forming a light diffusion layer 8 thereon.

In any cases, the obtained optical films 9 show, for example in the case of the light shield layer 7 being about 5 $\mu$m, the light transmittance of 90% or more in the light passing region 6 and the optical density of 3.5 in the light shield region 5.

EXAMPLE 3

Figure 4A:
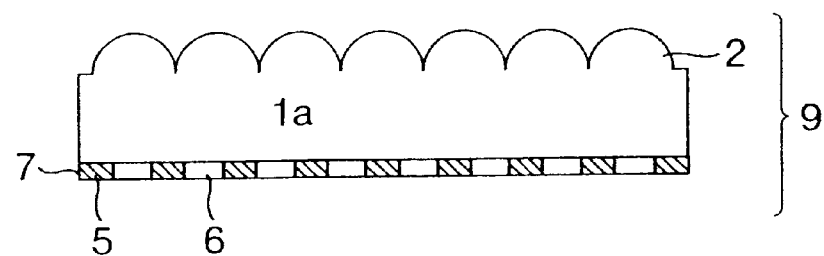
FIGS. 4A to 4C are cross-sectional views for explaining the optical film obtained in Example 3.
Figure 4B:
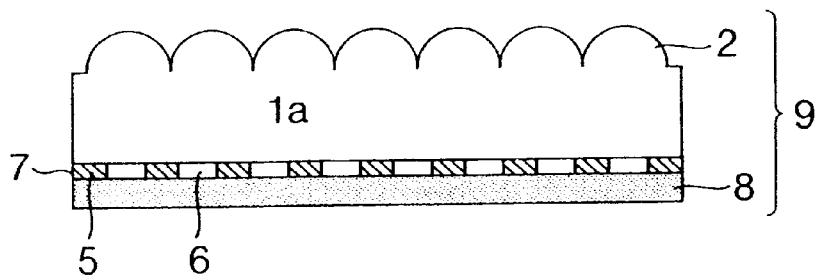
Figure 4C:
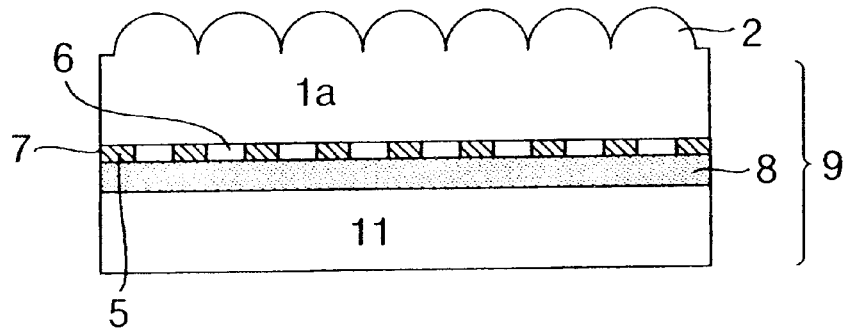

FIGS. 4A to 4C show the structure of optical films.

In the optical film shown in FIG. 4A, PET (polyethylene terephthalate) film 1a was used as the film 1 for microlenses.

First, microlenses 2 were formed on the PET film 1a by heated roll transfer using a Ni stamper for forming microlenses, followed by lamination of a light shield layer forming film 4 coating silver halide salt sensitizing agent thereon on the opposite side of the microlenses 2 formed side. Then, a light shield layer was formed by a reverse developing method to obtain an optical film 9.

The reverse developing method is a method for forming a light shield layer comprising bleaching (removing by dissolution) a silver halide latent image formed in a light exposed region, exposing the silver halide in a non-exposed region again to form a latent image, followed by development and fixation mentioned above.

More in detail, after conducting self alignment exposure via microlenses 2, a gelatin film is subjected to a hard film treatment by a first development step. Then, the exposed region is bleached using a potassium permanganate solution to remove silver, followed by a second exposure (whole surface exposure), a second development, fixation, and drying to obtain the desired optical film 9.

FIG. 4B shows an optical film 9 wherein a light diffusion layer 8 is formed on the light shield layer 7 shown in FIG. 4A.

FIG. 4C shows an optical film 9 obtained by bonding a film for light diffusion 11 (polycarbonate) forming a light diffusion layer 8 thereon to the optical film 9 shown in FIG. 4A.

In any cases, ability of the optical films was, when the light shield layer was about 5 μm thick, the light transmittance was 90% or more in the light passing region 6 and the optical density was 3.5 in the light shield region 5.

EXAMPLE 4

FIGS. 5A to 5D show the structure of optical films.

Figure 5A:
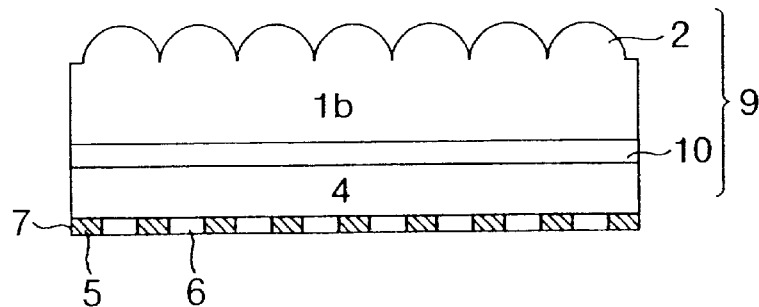
FIGS. 5A to 5D are cross-sectional views for explaining the optical film obtained in Example 4.

FIG. 5A shows an optical film 9 obtained by forming a TAC (triacetylcellulose) film 1b by a conventional extrusion molding, forming microlenses 2 by a heated roll transfer method using a Ni made stamper for forming lens, bonding a light shield layer forming film 4 coating a silver halide sensitizing agent thereon to the opposite side of the microlens formed side using an adhesive 10, and forming a light sheild layer 7 using a so-called solarization method, wherein an optical density (photographic density) is lowered by excess exposure.

Figure 5B:
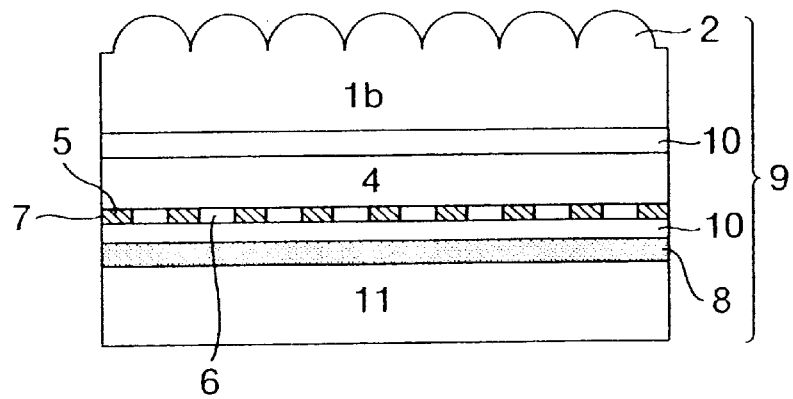

FIG. 5B shows an optical film 9 obtained by bonding a TAC film 11 forming a light diffusion layer 8 thereon to the optical film 9 shown in FIG. 5A.

Figure 5C:
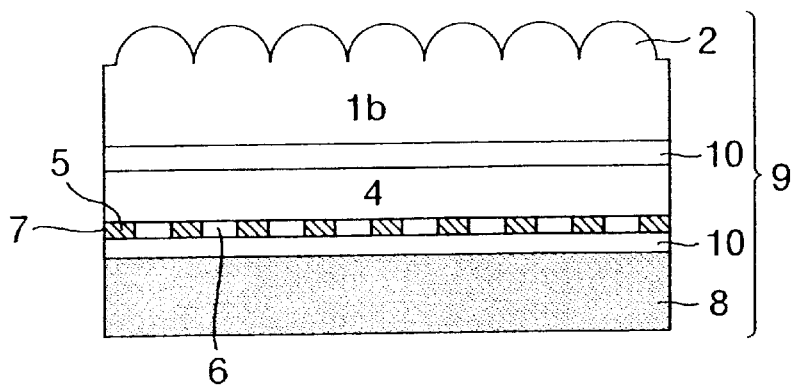

FIG. 5C shows an optical film 9 obtained by bonding a light diffusion film 8 (polycarbonate) to the optical film shown in FIG. 5A using an adhesive 10.

Figure 5D:
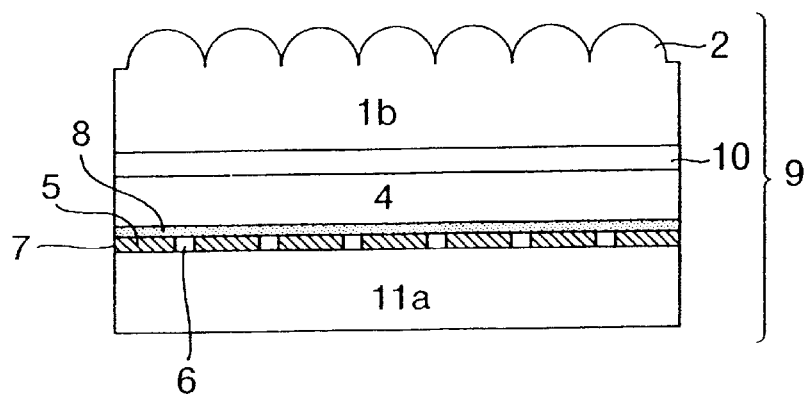

FIG. 5D shows an optical film 9 obtained by the following process. After forming a light diffusion layer 8 on a light shield layer forming film 4, a silver halide salt photosensitizing agent was coated thereon, followed by bonding a TAC film 1b and the light shield layer forming film 4 using an adhesive 10. The light shield layer 7 was formed in the same manner as mentioned above, but since the silver halide salt sensitizing agent per se is a very thin (e.g. 5 μm), enlargement of the light within the layer of the silver halide salt sensitizing agent was negligible, said light passing through the light diffusion layer 8 from the microlenses 2 at the time of exposure. That is, the light shield region 5 and the high light passing region 6 were clearly separated in the formed light shield layer 7. In FIG. 5D, numeral 11a denotes a protective film, which can be omitted, if desired.

In any cases, the optical films 9 showed the same good optical properties as those shown in FIGS. 1, 3A to 3D and FIGS. 4A to 4C. Particularly when the light diffusion layer 8 is formed between the microlenses 2 and the light shield layer 7, the contrast properties are more improved.

EXAMPLE 5

Figure 6:
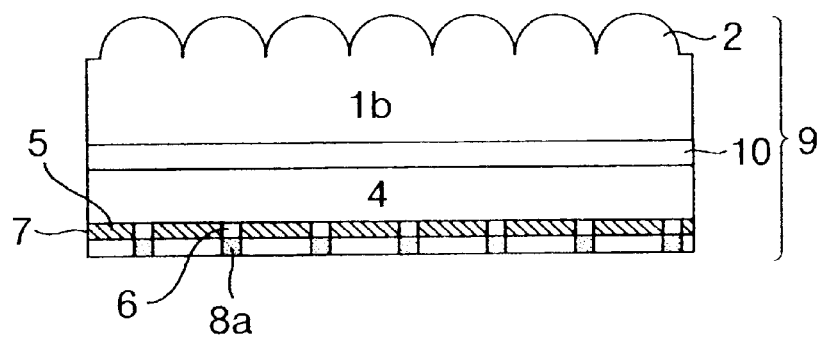
FIG. 6 is a cross-sectional view for explaining the optical film obtained in Example 5.

The optical film 9 shown in FIG. 6 was obtained by forming a light diffusion layer 8a on the areas corresponding to the light passing region 6 formed in the light shield layer in the optical film shown in FIG. 5A. In this case, the image quality obtained through the optical film 9 was sharper than that obtained in the optical film 9 of FIG. 5A.

EXAMPLE 6

Figure 7A:
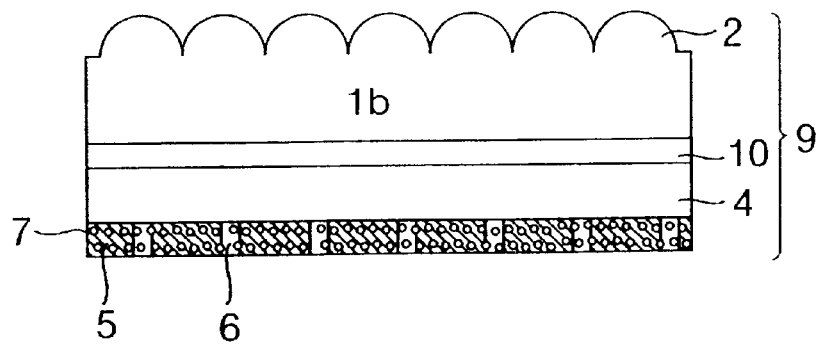
FIGS. 7A and 7B are cross-sectional views for explaining the optical film obtained in Example 6.
Figure 7B:
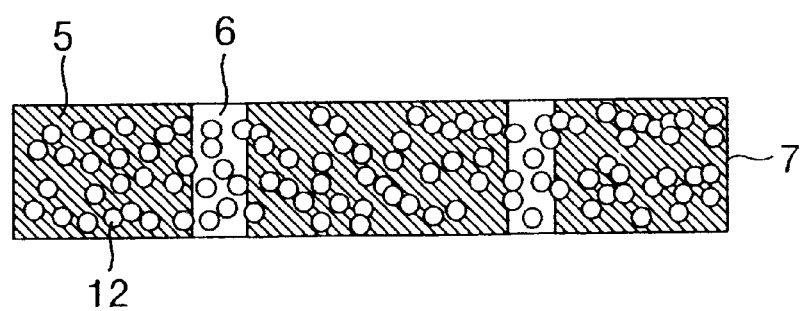
Figure 8:
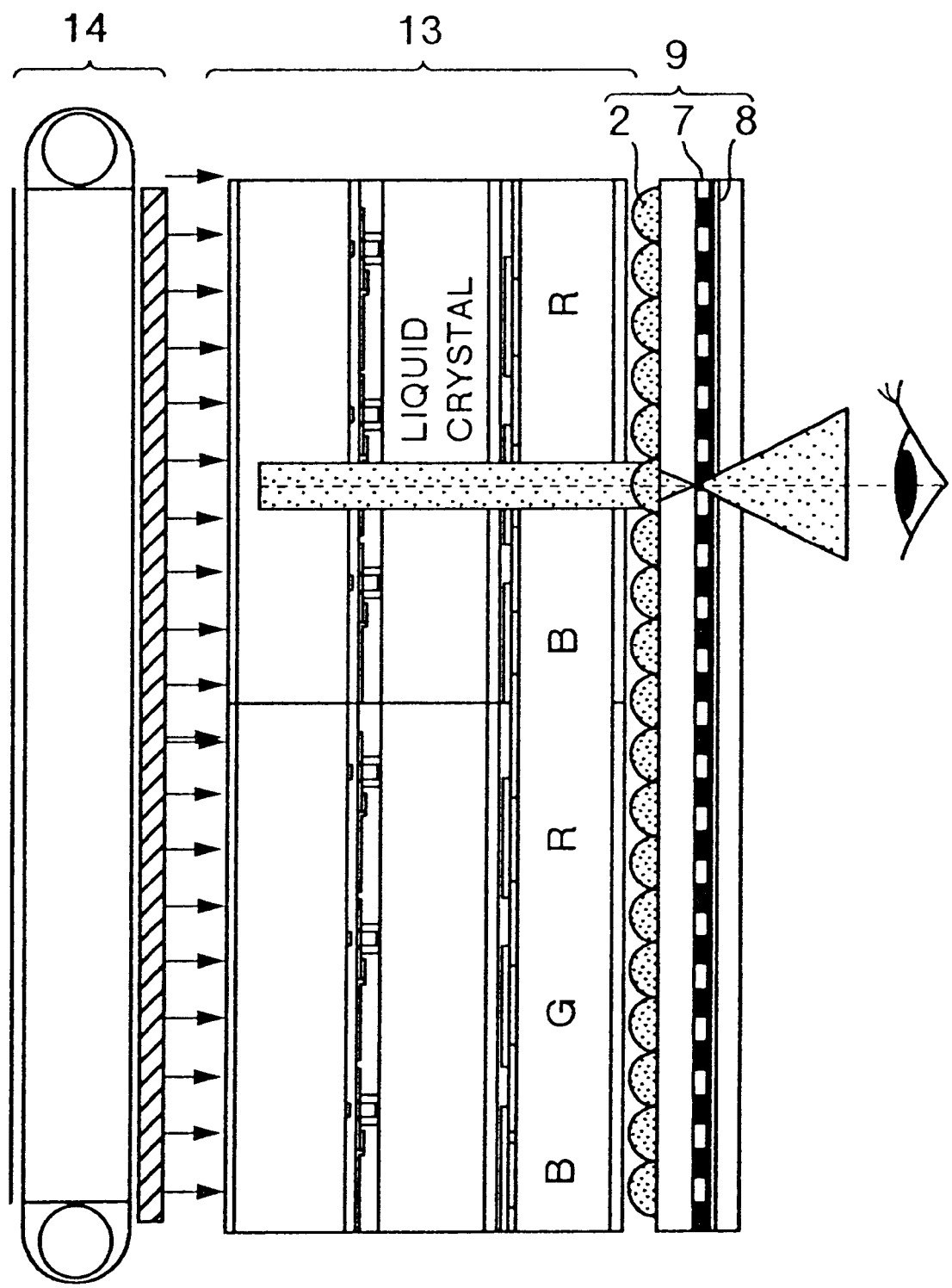
FIG. 8 is a cross-sectional view for explaining the structure of the liquid crystal display obtained in Example 7.

FIG. 7A shows another example of an optical film 9, which was obtained in the same manner as that shown in FIG. 5A, but the light shield layer 7 has the function of the light diffusion layer 8. FIG. 7B is an enlarged cross-sectional view of the light shield layer 7. As shown FIG. 7B, small balls 12 made from a material having large light transmissivity are mixed in a predetermined amount at the time of coating the silver halide salt sensitizing agent on the light shield layer forming film 4.

The predetermined amount can be determined so as not to damage the light shield properties in the light shield region 5 by the small balls 12 contained in the light shield region 5, when the light shield region 5 and the high light passing region 6 are formed in the light shield layer 7. In this Example, a suitable amount is about 1 to 30% by weight based on the weight of the silver halide salt sensitizing agent.

As the materials for the small balls 12, there can be used inorganic compounds such as glass, silica, titanium oxide, etc., and organic materials such as plastics, e.g. polystyrene, melamine resins (refractive index 1.57), acrylic resins (refractive index 1.49), acrylic styrene resins (refractive index 1.54), polycarbonates, polyethylene, polyvinyl chlorides, silicone resins, etc. It is preferable to use the small balls having a particle size of about 0.1 to 5, or 6 μm.

By the structure mentioned above, the incident light through the microlenses 2 is sufficiently shielded in the light shield region 5, and is emitted outside while dispersed by the small balls 12 in the high light passing region 6, so that the same effects as those obtained by installing the light diffusion layer 8 can be obtained.

EXAMPLE 7

FIG. 7 shows a liquid crystal display apparatus comprising an optical film 9, a liquid crystal cell 13 and a rear illumination means 14 emitting collimate light, wherein the side forming microlenses 2 constituting the optical film 9 and the light emitting side in the rear illumination means are positioned oppositely and sandwiching the liquid crystal cell 13. As the optical film 9, there can be used any ones obtained in Examples 1 to 6.

By a driving means (not shown in the drawing), the liquid crystal cell 13 and the rear illumination means were controlled and the image information displayed by the liquid crystal cell 13 were observed via the optical film 9.

As a result, when the optical film 9 was not installed, the angle of field properties were about ±30° against up and down and left and right directions. By installing the optical film 9, the angle of field properties were remarkably improved to about ±60° against the up and down, and left and right directions in the range not causing a hue reverse phenomenon.

The angle of field properties were evaluated by defining an angle of field as an angle by which the intensity of light perpendicular to the liquid crystal cell among light passing through the liquid crystal cell is reduced to a half.

EXAMPLE 8

Figure 9:
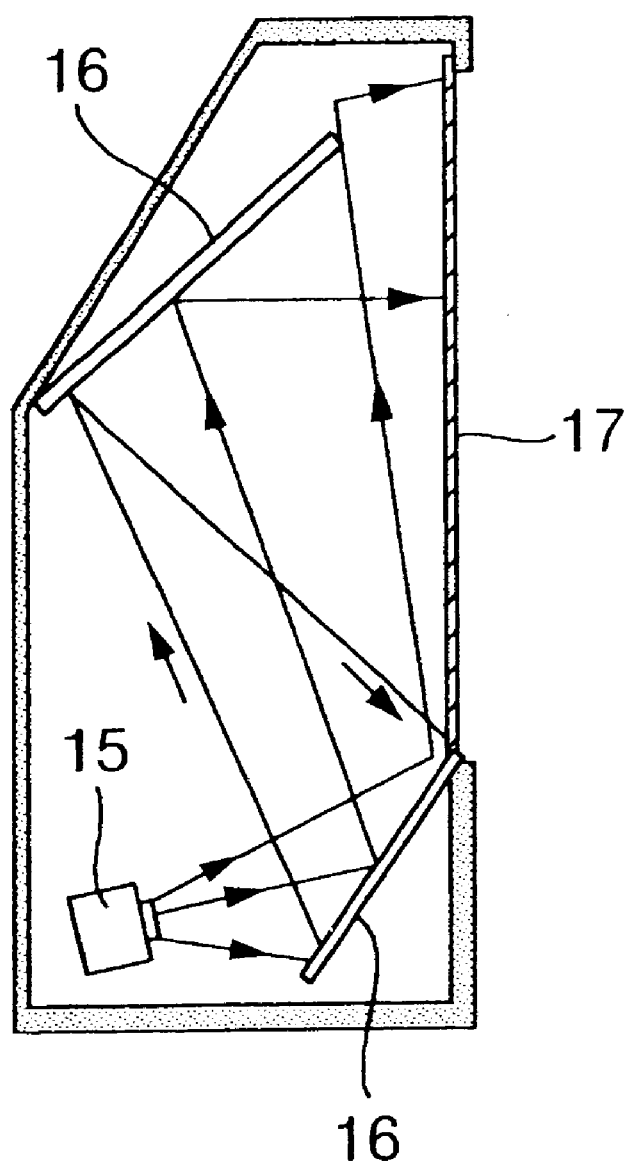
FIG. 9 is a rough sketch for explaining the rear projection type image display apparatus obtained in Example 8.

FIG. 9 shows a rear projection type image display apparatus comprising a projector 15 having a light source and a liquid crystal cell, a mirror 16 for reflecting the light emitted from the projector 15, and a screen for projecting the light reflected by the mirror 16. The screen 17 installs any one of optical films produced in Examples 1 to 6.

By a driving means (not shown in the drawing), the projector 15 having the light source and the liquid crystal cell is controlled, and the image information displayed by the liquid crystal cell is reflected by using the mirror 16. The image information is projected on the screen 17 in an enlarged form.

By using the rear projection type image display apparatus, the angle of field properties are remarkably improved by the microlenses 2 and the light diffusion layer 8, and the contrast properties were remarkably improved by the light shield layer 7 compared with the case of using a screen not installing the optical film 9 of the present invention.

In this Example, the screen 17 installing the optical film 9 obtained in any one of Examples 1 to 6 of the present invention was used, but it is possible to use the optical film per se as the screen 17. For example, as shown in FIG. 3D, the film 1 for microlenses and the light shield layer forming film 4 can be bonded via glass, reinforced plastic, etc. Further, the light diffusion layer 7 can be bonded so as to contact with the above-mentioned glass, reinforced plastic, etc.

The present invention is not limited to the Examples mentioned above. Various modifications are possible withing the scope of the present invention. For example, it is possible to form a protective film or a reflection preventing film on the upper side of the light diffusion layer of the optical film. Further, it is possible to use a conventional technique for protecting the optical film of the present invention from ultraviolet light.

The optical film of the present invention comprising the micrelenses, the light shield layer using a silver halide salt sensitizing agent and the light diffusion layer exhibits wide angle of field properties and high contrast properties, and can be applied to image display appratuses to exhibit wide angle of field and high discrimination by naked eye for outer light.

What is claimed is:

1. An optical film comprising an optical element capable of forming a spatial distribution of light transmittance, said optical element comprising a film for microlenses and microlenses formed thereon, and a light shield layer positioned on an opposite side of the optical element, wherein said light shield layer is composed of silver or a compound containing silver, which changes light transmittance permanently depending on irradiation of an energy beam, and has light transmitting regions substantially at positions wherein incident light passed through the microlenses is focused on the film for microlenses and light shielding regions at positions other than the light transmitting regions, said light shielding regions having a smaller light transmittance than the light transmitting regions.

2. An optical film according to claim 1, wherein the compound containing silver is silver halide.

3. An optical film according to claim 1, wherein the light shield layer is composed of a gelatin material dispersing therein the silver or compound containing silver.

4. An optical film comprising an optical element capable of forming a spatial distribution of light transmittance, said optical element comprising a film for microlenses and microlenses formed thereon, and a light shield layer formed on one side of a film for light shield layer, and containing light transmitting regions and light shielding regions, the side having no microlenses of said film for microlenses and the side having no light shield layer of said film for light shield layer being bonded using an adhesive, wherein said light shield layer is composed of silver or a compound containing silver, which changes light transmittance permanently depending on irradiation of an energy beam, and has the light transmitting regions substantially at positions wherein incident light passed through the microlenses is focused on the film for microlenses and the light shielding regions at positions other than the light transmitting regions, said light shielding regions having a smaller light transmittance than the light transmitting regions.

5. An optical film comprising a film for microlenses, microlenses formed on one side thereof, and a light shield layer formed on an opposite side of the film for microlenses, wherein said light shield layer is composed of silver or a compound containing silver, which changes light transmittance permanently depending on irradiation of an energy beam, and has light transmitting regions substantially at positions wherein incident light passed through the microlenses is focussed on the film for microlenses and light shielding regions at positions other than the light transmitting regions, said light shielding regions having a smaller light transmittance than the light transmitting regions.

6. An optical film comprising microlenses formed on one side of a film for microlenses, and a light shield layer formed on one side of a film for light shield layer, and containing light transmitting regions and light shield regions, the side having no microlenses of said film for microlenses and the side having no light shield layer of said film for light shield layer being bonded using an adhesive, wherein said light shield layer is composed of silver or a compound containing silver, which changes light transmittance permanently depending on irradiation of an energy bean, and has light transmitting regions substantially at positions wherein incident light passed through the microlenses is focussed on the film for microlenses and light shielding regions at positions other than the light transmitting regions, said light shielding regions having a smaller light transmittance than the light transmitting regions.

7. An optical film according to claim 1, wherein the light transmitting regions and light shielding regions are regions self-aligned to the microlenses due to a reversally-developed light shield layer using the incident light passed through the microlenses and focused on the light shield layer.

8. An optical film according to claim 4, wherein the light transmitting regions and light shielding regions are regions self-aligned to the microlenses due to a reversally-developed light shield layer using the incident light passed through the microlenses and focused on the light shield layer.

9. An optical film according to claim 5, wherein the light transmitting regions and light shielding regions are regions self-aligned to the microlenses due to a reversally-developed light shield layer using the incident light passed through the microlenses and focused on the light shield layer.

10. An optical film according to claim 6, wherein the light transmitting regions and light shielding regions are regions self-aligned to the microlenses due to a reversally-developed light shield layer using the incident light passed through the microlenses and focused on the light shield layer.

* * * * *